US010612745B2

(12) United States Patent
Muegge

(10) Patent No.: US 10,612,745 B2
(45) Date of Patent: Apr. 7, 2020

(54) LIGHTING DEVICE FOR VEHICLES

(71) Applicant: HELLA GmbH & Co. KGaA, Lippstadt (DE)

(72) Inventor: Martin Muegge, Geseke (DE)

(73) Assignee: Hella GmbH & Co. KGAA, Lippstadt (DE)

(*) Notice: Subject to any disclaimer, the term of this patent is extended or adjusted under 35 U.S.C. 154(b) by 44 days.

(21) Appl. No.: 15/959,934

(22) Filed: Apr. 23, 2018

(65) Prior Publication Data

US 2018/0306400 A1 Oct. 25, 2018

(30) Foreign Application Priority Data

Apr. 21, 2017 (DE) .................. 10 2017 108 498

(51) Int. Cl.
*G03H 1/26* (2006.01)
*F21S 43/20* (2018.01)
(Continued)

(52) U.S. Cl.
CPC ............ *F21S 43/26* (2018.01); *B60Q 1/2607* (2013.01); *F21S 43/14* (2018.01); *F21S 43/239* (2018.01); *F21S 43/30* (2018.01); *F21S 43/40* (2018.01); *F21V 14/06* (2013.01); *F21V 23/04* (2013.01); *G03H 1/0005* (2013.01); *G03H 1/2205* (2013.01); *G03H 1/2286* (2013.01); *F21S 45/47* (2018.01); *F21W 2103/10* (2018.01);
(Continued)

(58) Field of Classification Search
CPC ...... G03H 1/0005; G03H 1/22; G03H 1/2205; G03H 1/2286
See application file for complete search history.

(56) References Cited

U.S. PATENT DOCUMENTS 5,455,747 A * 10/1995 Aoyama ............... B60Q 1/2607
362/545
2007/0035952 A1 2/2007 Laffert-Kobylinski
(Continued)

FOREIGN PATENT DOCUMENTS

DE 4421306 A1 1/1995
DE 102015107644 A1 11/2016
(Continued)

*Primary Examiner* — Evan P Dzierzynski
*Assistant Examiner* — Keith G. Delahoussaye
(74) *Attorney, Agent, or Firm* — Muncy, Geissler, Olds & Lowe, P.C.

(57) ABSTRACT

A lighting device for vehicles having a light source unit and having an optical unit containing a lens arrangement with a multiplicity of lens elements, wherein the lens elements are arranged so as to be distributed in a matrix-like manner, in that a flat film material with a multiplicity of film segments, each of which contains graphic elements, is located upstream of the lens arrangement in the light path and downstream of the light source unit in the light path, wherein the graphic elements are recorded by exposure of the film material equipped with the lens arrangement, in that different lens elements of the lens arrangement are associated with each of the film segments in such a manner that a luminous graphic containing the graphic element is created to form the light distribution and lighting function through illumination of the film material by means of the light source unit.

17 Claims, 11 Drawing Sheets

(51) Int. Cl.

| | | |
|---|---|---|
| *B60Q 1/26* | (2006.01) | |
| *F21S 43/40* | (2018.01) | |
| *F21S 43/14* | (2018.01) | |
| *F21S 43/30* | (2018.01) | |
| *F21S 43/239* | (2018.01) | |
| *F21V 14/06* | (2006.01) | |
| *F21V 23/04* | (2006.01) | |
| *G03H 1/00* | (2006.01) | |
| *G03H 1/22* | (2006.01) | |
| *F21S 45/47* | (2018.01) | |
| *F21Y 115/10* | (2016.01) | |
| *F21W 103/10* | (2018.01) | |
| *F21W 103/35* | (2018.01) | |
| *F21W 103/20* | (2018.01) | |
| *F21W 103/55* | (2018.01) | |

(52) U.S. Cl.
CPC ..... *F21W 2103/20* (2018.01); *F21W 2103/35* (2018.01); *F21W 2103/55* (2018.01); *F21Y 2115/10* (2016.08); *G03H 2222/13* (2013.01); *G03H 2223/23* (2013.01); *G03H 2223/24* (2013.01); *G03H 2227/03* (2013.01)

(56) References Cited

U.S. PATENT DOCUMENTS

| | | |
|---|---|---|
| 2017/0349095 A1 | 12/2017 | Wimmer et al. |
| 2018/0195680 A1 | 7/2018 | Muegge |
| 2019/0152251 A1* | 5/2019 | Schilling ................ G03B 25/02 |

FOREIGN PATENT DOCUMENTS

| | | |
|---|---|---|
| DE | 102015115128 A1 | 3/2017 |
| WO | WO2005022255 A2 | 3/2005 |
| WO | WO2016071063 A1 | 5/2016 |

\* cited by examiner

LIGHTING DEVICE FOR VEHICLES

This nonprovisional application claims priority under 35 U.S.C. § 119(a) to German Patent Application No. 10 2017 108 498.3, which was filed in Germany on Apr. 21, 2017, and which is herein incorporated by reference.

BACKGROUND OF THE INVENTION

Field of the Invention

The present invention relates to a lighting device for vehicles having a light source unit and having an optical unit containing a lens arrangement with a multiplicity of lens elements.

Description of the Background Art

A lighting device for vehicles is known from DE 10 2015 115 128 A1, which is incorporated herein by reference, that has a light source unit and an optical unit for generating a predetermined light distribution. So that the generated lighting function has a spatial appearance with, in particular, an effect of depth, the optical unit contains a hologram arrangement, by means of which it is possible to generate a holographic luminous graphic. Despite limited installation space for the lighting device, it is possible by this means to generate a virtual luminous hologram area that is located between a cover plate terminating the housing of the lighting device and the actual light-generating hologram element. For example, several of these luminous hologram areas can be arranged in different planes so that an especially great depth effect can be achieved.

To achieve a three-dimensional lighting effect of lighting devices located in vehicle passenger compartments, it is known from WO 2016/071063 A1, which corresponds to US 2017/0349095, to provide a lens arrangement with a multiplicity of lens elements. The lens elements extend linearly in a plane of extent of the lens arrangement. A light pattern with an effect of depth can advantageously be produced by this means. It is a disadvantage of the known lighting device that the spatial appearance is limited, and is determined exclusively by the layout of the lens elements.

Known from WO 2005/022255 A2, which corresponds to US 2007/0035952, is a photo system or a film surface for reproduction of image objects, by means of which a spatial image impression of the image object is made possible. The film surface is implemented as a film sheet to which a lens arrangement is attached. The lens arrangement is located on a side facing the image object to be recorded. The image object, present as, e.g., a spatial photo, is recorded through exposure of the film surface within a predetermined time interval. During this process, an image of the image object to be depicted is applied to the film surface by each lens element of the lens arrangement. To reproduce the image object, the viewer then looks through the film surface provided with the lens arrangement, so that the viewer can perceive the image object recorded in the film surface from different viewing angles at the same time. A spatial impression of the image object is produced as a result. The lens elements are implemented as cylinder lenses that extend in a distributed manner over the plane of the lens arrangement. As a photographic film, the known film surface permits the reproduction of three-dimensional image objects. However, it does not represent a lighting device for generating a predetermined light distribution that, in particular, can be used for taillights or headlights in motor vehicles.

SUMMARY OF THE INVENTION

It is therefore an object of the present invention to provide a lighting device for vehicles such that a spatial appearance of light signatures or lighting functions is produced in a simple way with the smallest possible overall installation depth.

In an exemplary embodiment, the lens elements are arranged so as to be distributed in a matrix-like manner, such that a flat film material with a multiplicity of film segments, each of which contains graphic elements, is located upstream of the lens arrangement in the light path and downstream of the light source unit in the light path, wherein the graphic elements are recorded by exposure of the film material equipped with the lens arrangement, such that different lens elements of the lens arrangement are associated with each of the film segments in such a manner that a luminous graphic containing the graphic element is created to form the light distribution and the lighting function through illumination of the film material by means of the light source unit.

The lighting device according to the invention makes it possible to display a spatial luminous graphic by means of which a predefined light distribution or lighting function can be provided. It is advantageously possible to produce signal functions with different luminous graphics that additionally have a depth effect along with the minimum luminous area prescribed by law. The luminous graphics may have any desired three-dimensional shape, which can be used for manufacturer-specific customization of the signal function. All that is necessary for this purpose is for the film material to be exposed with the appropriate graphic elements or image objects, while the other components of the lighting device can remain identical or unchanged. The invention thus makes possible a three-dimensional lighting function with a strong depth effect, wherein, for instance, the luminous graphic appears in a region in front of or behind a transparent cover plate of the lighting device, virtually floating in space. For example, the luminous graphic can include multiple graphic elements that are arranged so as to be stacked in depth, so that a first graphic element appears as a luminous element in front of the cover plate and a second graphic element appears as a luminous element behind the cover plate.

According to an embodiment of the invention, each film segment of the film material located in an operating position has the same or a similar graphic element. In the operating position, the film material has a fixed position relative to the lens arrangement, so that each film segment is associated with a single lens element of the lens arrangement. The spatial appearance of the graphic element is produced through the fixed association of the lens elements with the applicable film segments. In this design, the film material is associated in a fixed manner with the same lens arrangement both during recording (exposure) and during reproduction, which is to say that preferably no relative displacement can arise between the lens arrangement and the flat film material. Advantageously, the incorporation and reproduction of the graphic elements for generating the light distribution can be easily manufactured or easily installed by this means.

According to an embodiment of the invention, the lens arrangement can have a carrier, on which the lens elements are arranged at equal distances in the manner of rows and columns. The lens elements extend along a carrier surface that is parallel to a film surface formed by the film material. By means of the same center-to-center distance between the lens elements, it is possible to generate a luminous graphic in a space-saving way.

According to an embodiment of the invention, the light source unit can be controlled in such a manner that a first film segment is more strongly illuminated than a second film segment of the film material. Advantageously, a visual highlighting of one part of the generated luminous graphic can be provided by this means. In addition, the light source unit can be controlled in such a manner that multiple film segments can be switched on or cut in sequentially to bring about a dynamic switch-on of the entire luminous graphic. In the reverse case, an animated switch-off of the luminous graphic also takes place.

According to an embodiment of the invention, a distance between adjacent lens elements in a range from 0.5 mm to 2.00 mm is provided. The lens elements thus have a dimension such that a separate semiconductor-based light source (LED light source) can be positioned behind each light element. A relatively bright luminous graphic can advantageously be generated by this means.

According to an embodiment of the invention, the film material is arranged with its back at a distance of 1.5 mm to 4 mm from the light source unit having lens elements arranged in a matrix-like manner on the one hand and with its front directly at a boundary surface of the lens arrangement on the other hand. As a result, the lens element with the film material advantageously has a relatively small overall installation depth, which is a maximum of 8.5 mm.

According to an embodiment of the invention, the lighting device has a primary optics device that is located downstream of the light source unit in the light path and upstream of the lens arrangement in the light path and that can be designed as a flat light guide or as a light guide with domed lateral surfaces or as a reflector arrangement. An optical unit that is adapted to the intended application can advantageously be employed as a result.

According to an embodiment of the invention, the primary optics device has a first optical plate with lenses for focusing the light emitted by the light source unit, and a second optical plate with lenses for parallelizing the light. Where appropriate, the second optical plate can have an optical structure on a front side facing the film surface in order to achieve a homogeneous illumination of the luminous graphic assembly composed of the film surface and the lens arrangement. The optical structure can be implemented as, for example, pillow optics or strip optics, preferably as micro-optical elements with a size between 0.3 mm and 1.5 mm, or as diffractive diffuser optics that have optical elements dimensioned considerably smaller than the lens elements on a back of the second optical plate or of the first optical plate.

According to an embodiment of the invention, the lens arrangement has lens elements arranged on both sides of its plane of extent, wherein pairs of lens elements are formed. The lens elements of the pairs of lens elements have the same optical axis in this design. The spatial character of the luminous graphic can advantageously be improved by this means.

According to an embodiment of the invention, a separate light source is associated with each lens element of the lens arrangement. A high luminous flux for backlighting the film surface or a targeted illumination of the lens elements is advantageously achieved by this means.

According to an embodiment of the invention, the film surface is arranged so as to be movable in its direction of extent relative to the lens arrangement, so that a number of first film segments are located on the optical axis of the lens elements for generating a first luminous graphic in a first relative position and a number of second film segments are located on the optical axis of the lens elements for generating a second luminous graphic in a second relative position. The first film segments and the second film segments have different graphic elements in this case so that the projection of different luminous graphics is provided. Different lighting functions can advantageously be generated in a space-saving way by this means. The basic idea of the invention in this case is that different lighting functions can be produced merely through local shifting of the relative positions of the film surface and lens arrangement. It is assumed here that the film segments have a smaller dimension than the lens elements, since otherwise an interaction between the two graphic elements could arise. The film surface must therefore have a higher resolution than the lens arrangement.

According to an embodiment of the invention, the light source unit is controlled in such a manner that light with a higher light intensity is emitted in the second position of the film surface relative to the lens arrangement than in the first relative position of the same. The first relative position of the lens arrangement relative to the film surface can thus be used for a taillight function, for example, in which the light sources are controlled so as to be dimmed. The second position of the lens arrangement relative to the film surface can be used for a brake light function, for example, in which the light sources are supplied with full current.

According to an embodiment of the invention, the light sources are designed as two-color light sources or as RGB light sources so that a luminous graphic appears in a first color or in a second color as a function of the position of the lens arrangement relative to the film surface and/or of the desired lighting function. For example, a turn signal function can be produced by this means with yellow light emission, and a taillight function with red light emission.

According to an embodiment of the invention, the film surface is provided with a holder that is coupled to an adjusting device containing a stepper motor or to an eccentric shaft or a linear piezo drive for motion of the film surface relative to the lens arrangement. If appropriate, an adjusting device can be provided that can adjust the holder not just in one direction, but instead in two mutually perpendicular directions, so that the lens elements can be brought into spatial alignment with multiple film segments, for example five film segments. In this way five different luminous graphics could be generated. Different lighting functions can advantageously be generated in a space-saving way by this means.

According to an embodiment of the invention, the holder of the film surface is designed as a rotary element that is arranged so as to rotate about an axis of rotation extending parallel to the film surface or the lens arrangement. The film surface and the lens arrangement form a luminous graphic assembly here, which are arranged at equal radial spacing in the circumferential direction of the rotary element. As a function of the rotary position of the rotary element, therefore, different luminous graphic assemblies, in particular film surfaces with different graphic elements, can be brought into an illumination position in which the luminous graphic assembly is backlit by the light source unit. In the illumination position, the luminous graphic assembly is perpendicular to a primary direction of emission of the lighting device. In this embodiment, the lens arrangement and the film surface are in a fixed relative position. Different lighting functions can advantageously be generated by this means with no need for the lens elements to be adjusted to the applicable film segments.

According to an embodiment of the invention, a normal of all the luminous graphic assemblies is arranged to be perpendicular to the axis of rotation of the rotary element. The light source unit can advantageously be arranged to be stationary in an interior of the rotary element, so that the diameter of the rotary element defines the required installation space.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A lighting device according to the invention can be used to produce signal functions, for example a turn signal, taillight, brake light, position light, or daytime running light function. It may be used in the rear end or the front end of a vehicle or as any other light.

Figure 1:
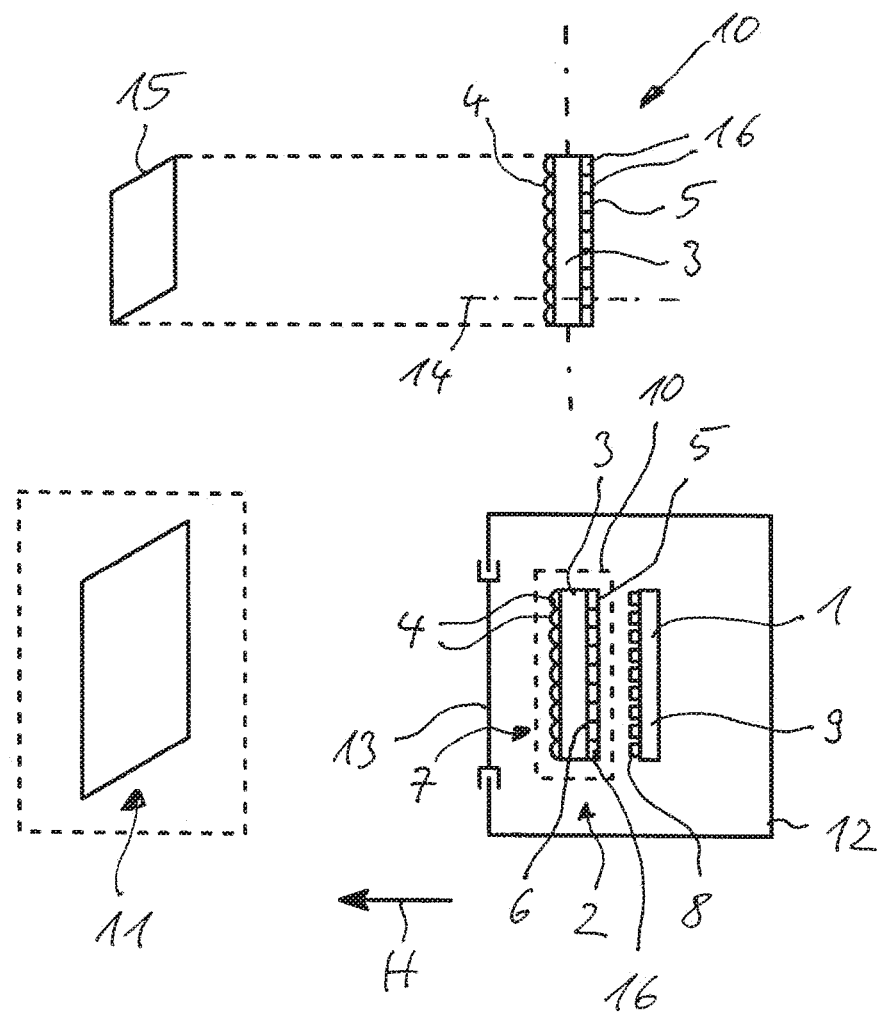
FIG. 1 is a schematic representation of a recording and reproduction of an image object that is generated through exposure or backlighting of a film surface provided with a lens arrangement.
Figure 2:
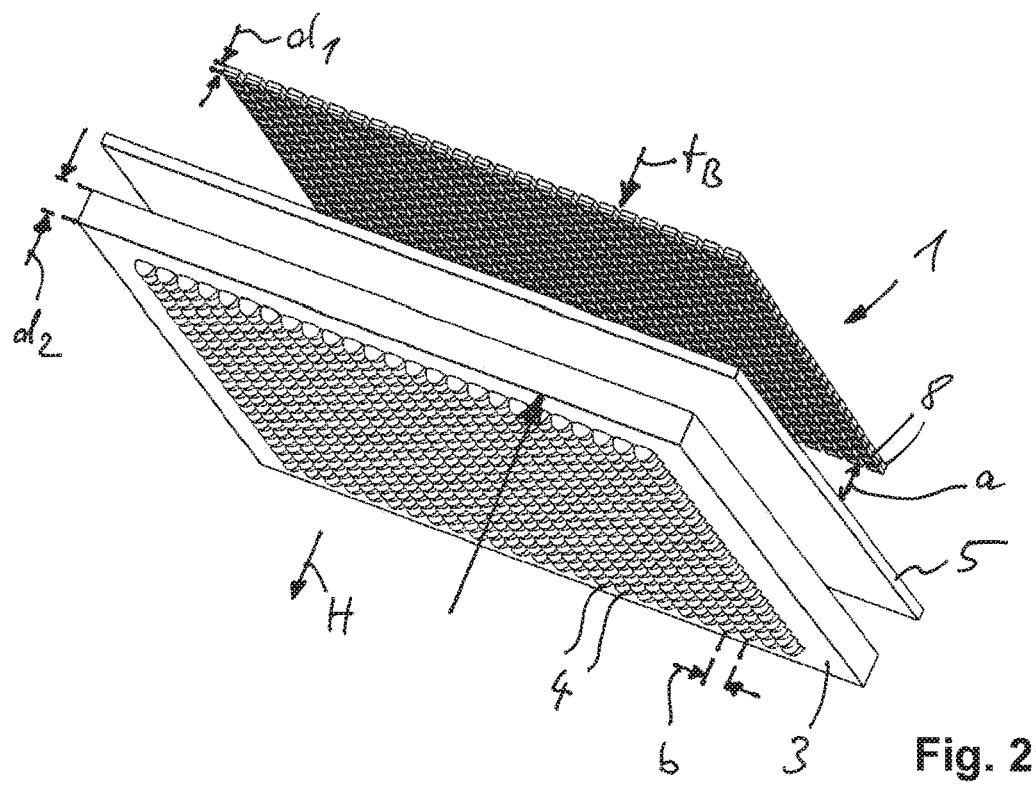
FIG. 2 is a perspective representation of the lighting device according to a first embodiment.

According to a first embodiment of the invention from FIGS. 1 and 2, the lighting device has a light source unit 1 and an optical unit 2 associated with the same to generate a predetermined light distribution. The optical unit 2 has a lens arrangement 3 with a multiplicity of lens elements 4 arranged on a side facing away from the light source unit 1. In addition, the optical unit 2 has a film material 5. The film material 5 is implemented as a film sheet, and is permanently attached to a flat or planar back 6 of the lens arrangement 3. The lens elements 4 are only provided on a front side 7, located at the front in the primary direction of emission H, of the lens arrangement 3. The lens elements 4 are arranged in a matrix-like manner, namely in the manner of rows and columns, exactly like the light sources 8 of the light source unit 1. The light sources 8 are implemented as semiconductor-based light sources, preferably as LED light sources, that are positioned on a carrier plate 9 implemented as a printed circuit board.

The film material 5 is located between the light source unit 1 and the lens arrangement 3, which is to say downstream of the light source unit 1 in the light path and upstream of the lens arrangement 3 in the light path. The film material 5 is permanently attached to the back 6 of the lens arrangement 3, for example by adhesive bonding or welding. The lens arrangement 3 forms, together with the film material 5, a luminous graphic assembly 10, in which a luminous graphic 11 is "stored" that is projected in a space in front of and/or behind a transparent cover plate 13 covering a housing 12 of the lighting device through backlighting by means of the light source unit 1 to produce the signal light function. The cover plate 13 covers an opening in the housing 12 in the usual way.

To record the luminous graphic 11, the film material 5 is exposed with a graphic element 15, which is present as a three-dimensional image object. During this recording, the lens elements 4 serve as an objective lens to project the image object onto the film material 5. The film material 5 is implemented as an ordinary photographic film material. In the present exemplary embodiment, the image object 15 is implemented as a rectangle, wherein a background is black and the image object is a white rectangle. The image object is projected onto the film material 5 as graphic elements 15 in extension of an optical axis 14 of each of the lens elements 4. Consequently, a multiplicity of graphic elements 15 in miniature are arranged on the film material 5. In extension of the optical axis 14 of each lens element 4, a single graphic element 15 is contained in each film segment 16 of the film 5. Since the image object or the luminous graphic 11 is not parallel to a plane of extent of the luminous graphic assembly 10, the miniaturized graphic elements 15 photographed on the film material 5 are not identical. The number of film segments 16, each of which has a single graphic element 15, matches the number of lens elements 4.

To reproduce the luminous graphic 11, the same luminous graphic assembly 10 is backlit by the light source unit 1. The luminous graphic 11 for producing the light distribution or the signal function is generated in a space in front of the cover plate 13. The shape of the reproduced luminous graphic 11 matches the recorded graphic elements 15 thereof. As a result of the large number of lens elements 4, the spatial character of the recorded graphic element 15 can be reproduced in the operating state of the lighting device.

For better clarity of the invention, the film material 5 is arranged at a distance from the lens arrangement 3 in FIG. 2. In the present exemplary embodiment, every individual film segment 16 or every individual lens element 4 is backlit by a separate light source 8. In this way, the lens elements 4 can be illuminated in targeted fashion so that a sufficiently high luminous flux is present for generating the desired signal function. Because of their great number, the light sources 8 can also be controlled in a dimmed manner if appropriate, so that they give off comparatively little heat and consume less energy on the whole.

For example, a first subsection of the film material 5 or of the luminous graphic assembly 10 can be illuminated more intensely than a second subsection of the film material 5 or of the luminous graphic assembly 10. The first subsection and the second subsection can include a number of first film segments or a number of second film segments in this case. By this means, a subsection of the image object 15 or of the luminous graphic 11 can advantageously be visually highlighted more strongly than a second part of the same.

Preferably, the light sources 8 are positioned at a relatively short distance, namely at a distance a of 1 mm to 4 mm from the film material 5. The light source unit 1 can have a thickness $d_1$ in the range from 2.5 mm to 3.5 mm. The lens arrangement 3 can have a thickness $d_2$ in a range from 2.5 mm to 3.00 mm. Because of its implementation as a film sheet, a thickness of the film material 5 is negligibly small in comparison with the thickness $d_1$ of the light source unit 1 or the thickness $d_2$ of the lens arrangement 3. Advantageously, the lighting device therefore has a small overall installation depth $t_B$ of at most 8.5 mm. When the lighting device is provided with a housing, the overall installation depth $t_B$ increases to a maximum of 11 mm. The housing can be made of a plastic material or of a metallic material (e.g., aluminum or magnesium). If the housing is made of a metallic material, it can be used as a heat sink at the same time. If appropriate, cooling fins arranged on a back of the housing could slightly increase the overall depth of the lighting device.

It is assumed that the lens arrangement 3 or the luminous graphic assembly 10 is flat in design. The carrier plate 9 of the light source unit 1 is likewise flat in design, and is parallel to the luminous graphic assembly 10.

Adjacent lens elements 4 or adjacent film segments 16 have a center-to-center distance b in the range from 0.5 mm to 2 mm, preferably a center-to-center distance of 2.00 mm. The spacing of adjacent lens elements 4 is thus somewhat larger than a center-to-center distance b of adjacent light sources 8, which is preferably 1.5 mm to 1.6 mm in the case of LED chips.

Figure 3:
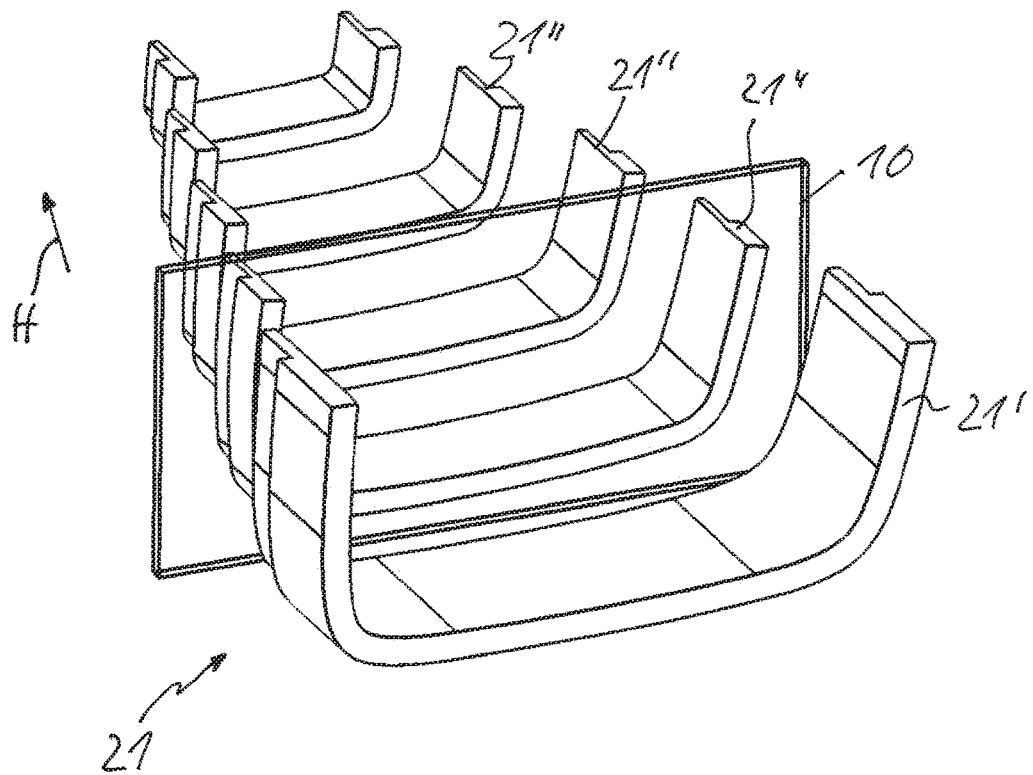
FIG. 3 is a schematic representation of a luminous graphic produced with the lighting device from FIG. 2.

FIG. 3 illustrates that different three-dimensional luminous graphics 21 for signaling functions can be generated as a function of the spatial arrangement of a black-and-white luminous graphic 21 relative to the luminous graphic assembly 10 during the recording of the film material 5. A luminous graphic 21' can, for example, be arranged behind the luminous graphic assembly 10 in the primary direction of emission H, and additional luminous graphics 21" can be arranged in front of the luminous graphic assembly 10 or the cover plate 13 in the primary direction of emission H.

Figure 4:
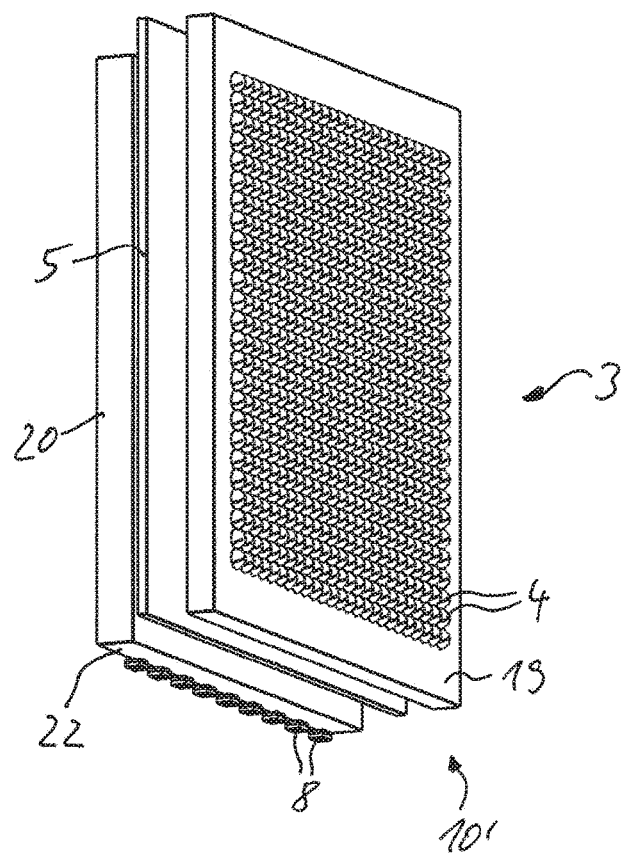
FIG. 4 is a perspective representation of a lighting device according to another embodiment, in which light is coupled into a flat light guide at the side of the lighting device.
Figure 5:
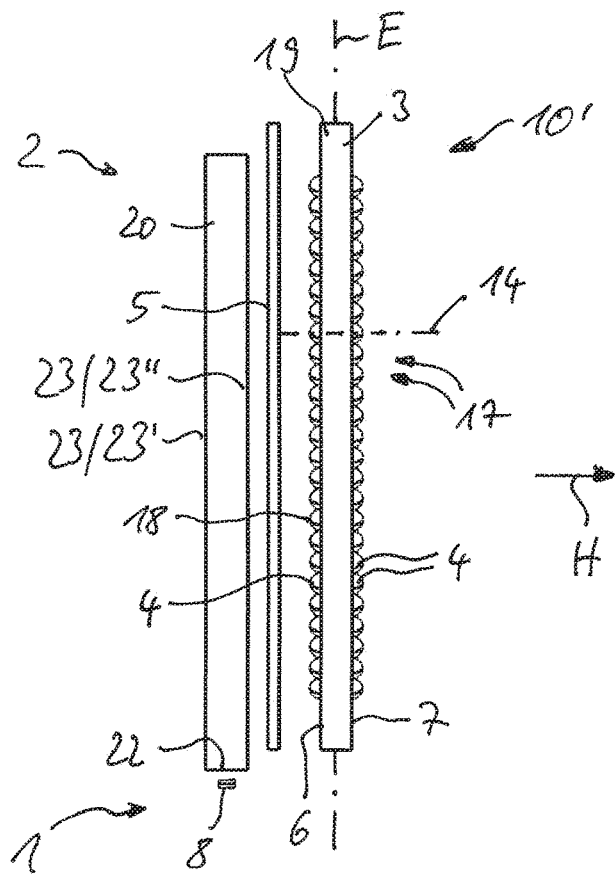
FIG. 5 is a side view of the lighting device from FIG. 4.

According to another embodiment of the invention from FIGS. 4 and 5, a luminous graphic assembly 10' is provided that differs from the luminous graphic assembly 10 according to the first embodiment in that a multiplicity of lens elements 4 are also arranged on the back 6 of the lens arrangement 3. Consequently, lens pairs 17 are formed, each of which consists of a lens element 4 located on the front side 7 and a lens element 4 located on the back 6 of the lens arrangement 3, wherein these two lens elements 4 of the pair have the same optical axis 14. The optical axis 14 is perpendicular to the plane of extent E of the lens arrangement 3. Furthermore, the optical axes 14 of the lens element pairs 17 are parallel to one another and perpendicular to the plane of extent E or perpendicular to the film material 5. In this embodiment, the film material 5 is arranged a short distance from the lens elements 4 located on the back or is arranged on the support of peaks 18 of the lens elements 4 that are raised in design. The peaks 18 of the lens elements 4 form an imaginary rear boundary surface of the luminous graphic assembly 10', which is parallel to the plane of extent E of the same. For better understanding, the film material 5 is shown a distance away from the lens arrangement 3 in FIGS. 4 and 5.

The lens elements 4 are each designed as dome-shaped, solid, transparent optical elements that are arranged/project in a lenticular manner from the plane of a preferably frame-like carrier 19 of the lens arrangement 3.

Identical components or component functions of the exemplary embodiments are labeled with identical reference characters.

Another difference in the embodiment from FIGS. 4 and 5 from the first embodiment consists in that the optical unit 2 additionally has a primary optics device that is located downstream of the light source unit 1 in the light path and upstream of the luminous graphic assembly 10 in the light path. The light from the light source unit 1 is coupled into the lighting device at the side. To this end, a flat light guide body 20 is located behind the luminous graphic assembly 10' in the primary direction of emission H, with light from the light sources 8 being coupled into the light guide at one narrow side 22 thereof. The light that is coupled in is totally reflected at opposite face sides 23 of the light guide body 20. Outcoupling elements on a rear face side 23' cause a portion of the coupled-in light incident on them to strike the front face side 23" in such a way that it is coupled out and then strikes the luminous graphic assembly 10'. The front face side 23" can be provided with an optical structuring that is produced through electric discharge machining, etching, or laser processes. The structuring may be, for example, prismatic or diffractive or holographic optics. As a result of this optical structuring, diffuse light is emitted from the flat light guide 20 towards the luminous graphic assembly 10'. An effective illumination of the film material 5 is advantageously achieved by this means. If appropriate, a housing wall located behind the flat light guide 20 in the primary direction of emission H can also be made white, so that light emitted to the back is reflected forward towards the luminous graphic assembly 10 again.

Figure 6:
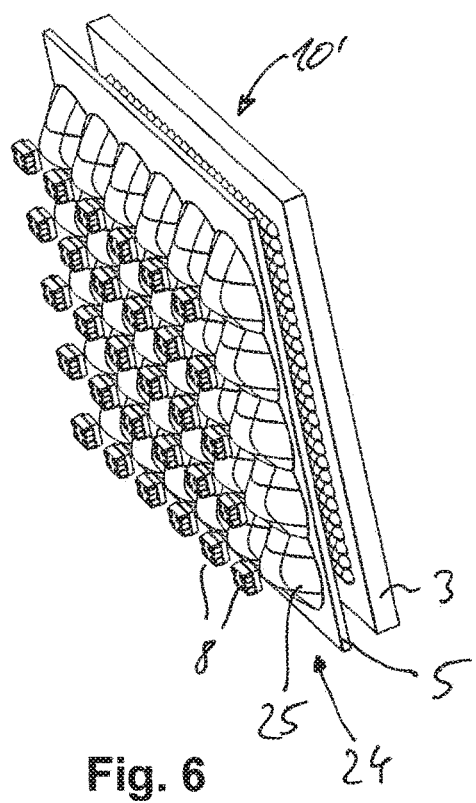
FIG. 6 is a perspective representation of another embodiment of the invention with, associated with each of the light sources, lenses that are arranged behind the film material in the primary direction of emission.
Figure 7:
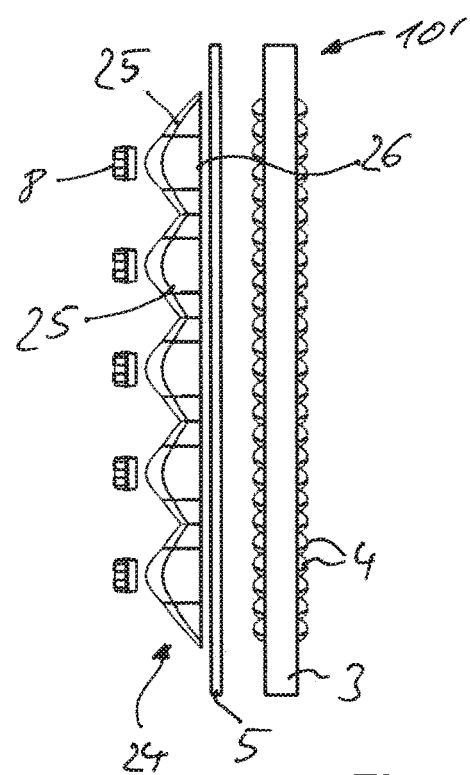
FIG. 7 is a side view of the lighting device from FIG. 6.

According to another embodiment of the invention from FIGS. 6 and 7, the optical unit 2 can additionally have a lens optics assembly 24, wherein each of the collimating lenses 25 of the lens optics assembly 24 are associated with one light source 8. As in the first embodiment, the light sources 8 are arranged so as to be distributed in a matrix-like manner in a plane of the light source that is parallel to the plane of extent E of the luminous graphic assembly 10. The collimating lenses 25 can be implemented as Fresnel lenses or as freeform lenses, each of which parallelizes light emitted from one of the light sources 8. If appropriate, the lens optics assembly 24 can be provided with optical structure elements on a preferably flat front side 26 to obtain a desired scattering. The optical structure can be manufactured through electric discharge machining, etching, or lasers, for example. The lens optics assembly 24 preferably is designed as a single piece, and is arranged in a plane between the light source unit 1 and the luminous graphic assembly 10'.

Figure 8:
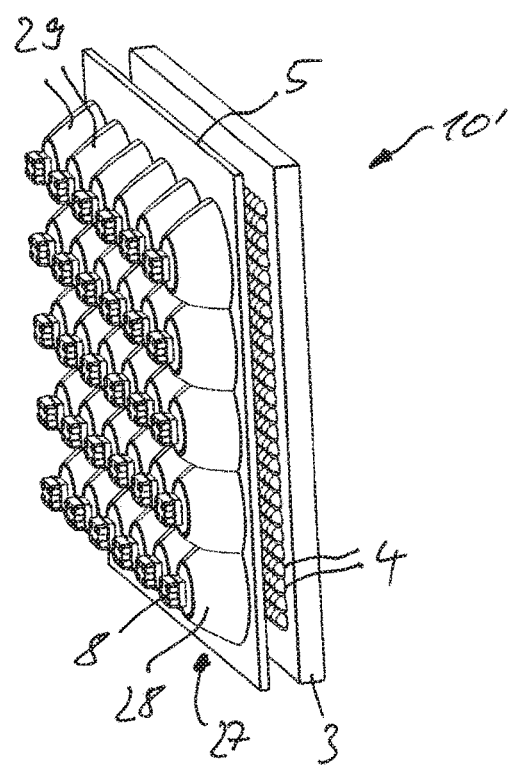
FIG. 8 is a perspective representation of a lighting device with, associated with each of the light sources, light guides containing curved lateral surfaces, wherein the light guides are arranged behind the film material in the primary direction of emission.
Figure 9:
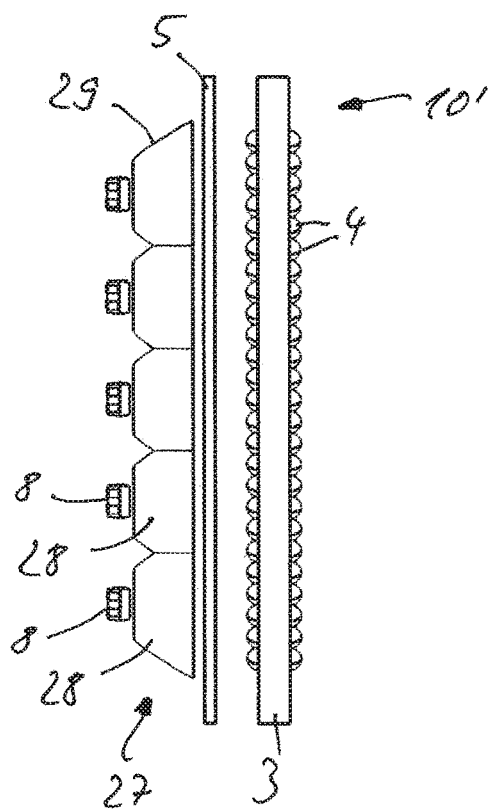
FIG. 9 is a side view of the lighting device from FIG. 8.

According to another embodiment of the invention from FIGS. 8 and 9, the optical unit 2 has, instead of the lens optics assembly 24, a light guide assembly 27 that has a multiplicity of light guide elements 28, each associated with a light source 8. The light guide elements 28 are designed as solid light guides and have totally reflecting lateral surfaces 29. The lateral surfaces 29 of the light guide elements 28 are curved, wherein a cross-sectional area of the light guide elements 28 increases continually from a back side facing the light sources 8 to a front side facing the luminous graphic assembly 10'. A face of each of the light guide elements 28 that faces the light sources 8 serves as the light input surface. A face that faces toward the luminous graphic assembly 10' serves as the light output surface. A collimated light beam that strikes the luminous graphic assembly 10' can be generated by means of the light guide assembly 27. Since the face that faces the light sources 8 has a recess, a larger portion of the light emitted by the light sources 8 can be captured, thus increasing the efficiency as compared to Fresnel lenses or freeform lenses (see FIGS. 6 and 7). In the present exemplary embodiment, the face of the light guide elements 28 that faces the luminous graphic assembly 10' is larger in size than the film segments 16 or lens elements 4. In the present exemplary embodiment, the transverse extent of the front face of the individual light guide elements 28 is five times as large as the center-to-center distance b of the lens elements 4. The number of light sources 8 can advantageously be reduced accordingly by this means.

According to an embodiment of the invention, the light guide elements 28 can also be made so small that the number of light guide elements 28 matches the pair 17 of lens elements 4. In this case, as in the first and second embodiments of the invention, the number of light sources 8 corresponds to the number of lens element pairs 17.

Figure 10:
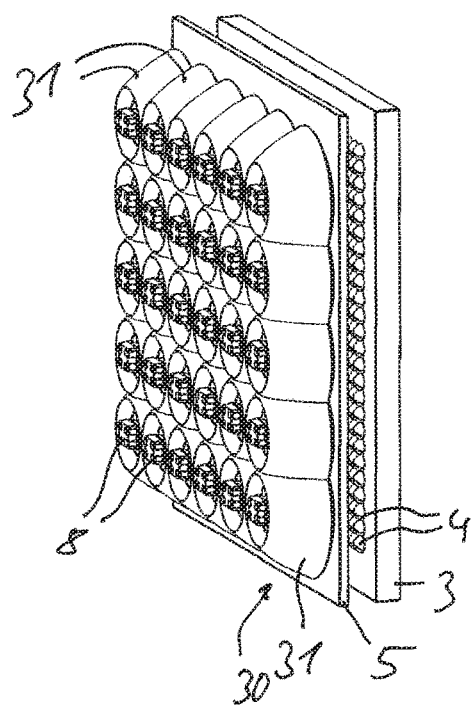
FIG. 10 is a perspective representation of a lighting device with, associated with each of the light sources, reflectors that are arranged behind the film material in the primary direction of emission.

According to another embodiment of the invention from FIG. 10, a reflector assembly 23 with a multiplicity of reflectors 31 can be provided instead of the light guide assembly 27. Since the light sources 8 are located in an opening of the reflectors 31, the overall installation depth of the lighting device can be reduced by this means.

Figure 11:
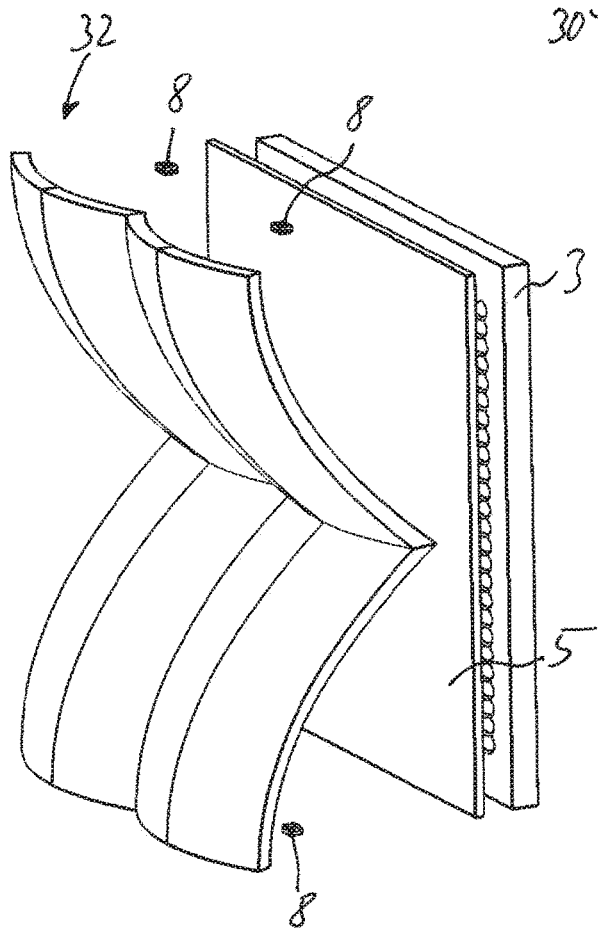
FIG. 11 is another embodiment of a lighting device, with laterally arranged light sources and reflectors associated with each of the same.
Figure 12:
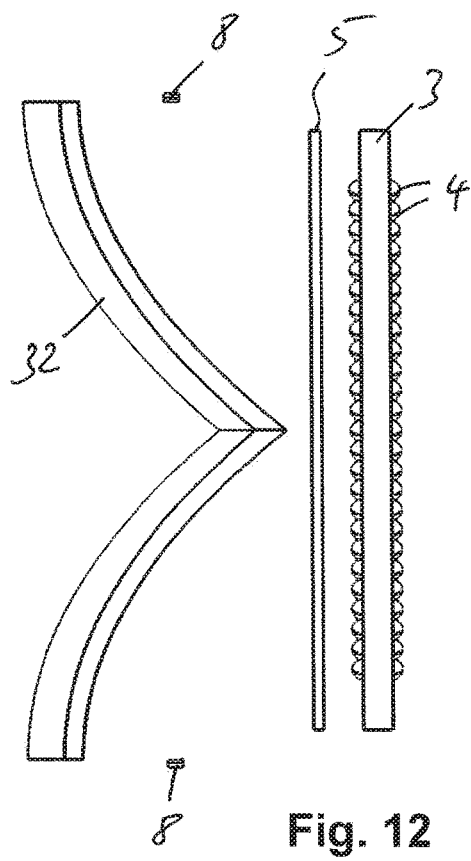
FIG. 12 is a side view of the lighting device from FIG. 11.

According to another embodiment of the invention from FIGS. 11 and 12, a reflector assembly 32 can be provided that permits a lateral arrangement of the light sources 8. This reflector assembly 32 replaces the flat light guide from FIGS. 4 and 5, as it were.

Figure 13:
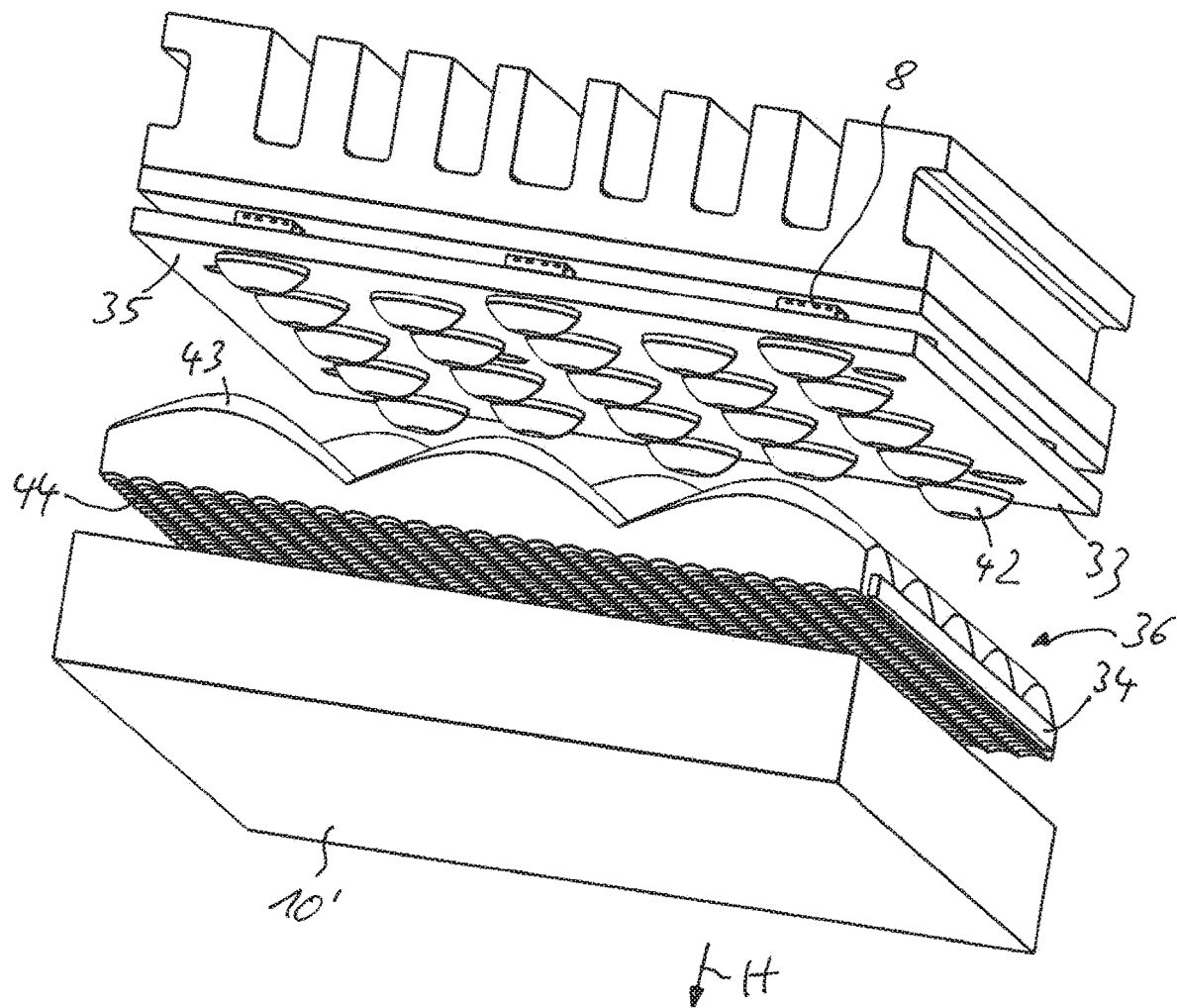
FIG. 13 is a perspective representation of a lighting device according to another embodiment, with two optical plates arranged between the film material and the light source unit.
Figure 14:
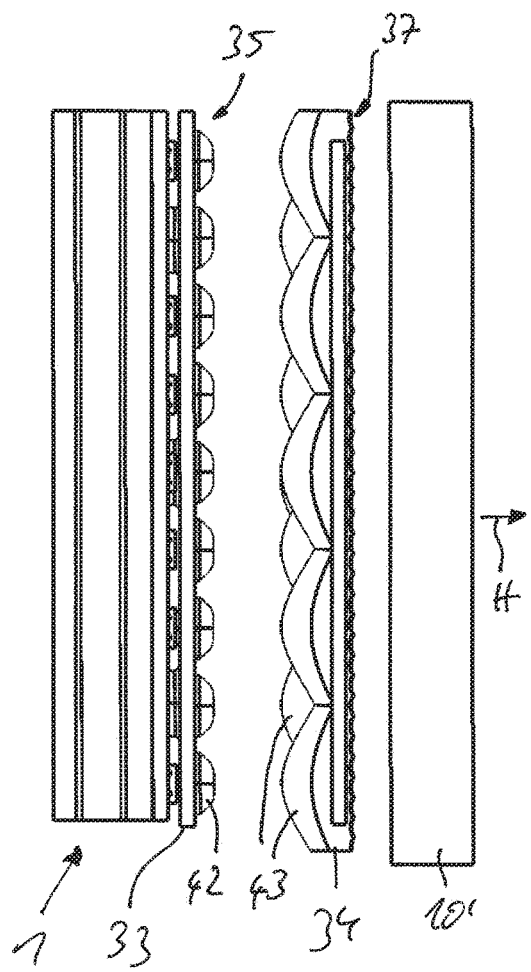
FIG. 14 is a side view of the lighting device from FIG. 13.
Figure 15:
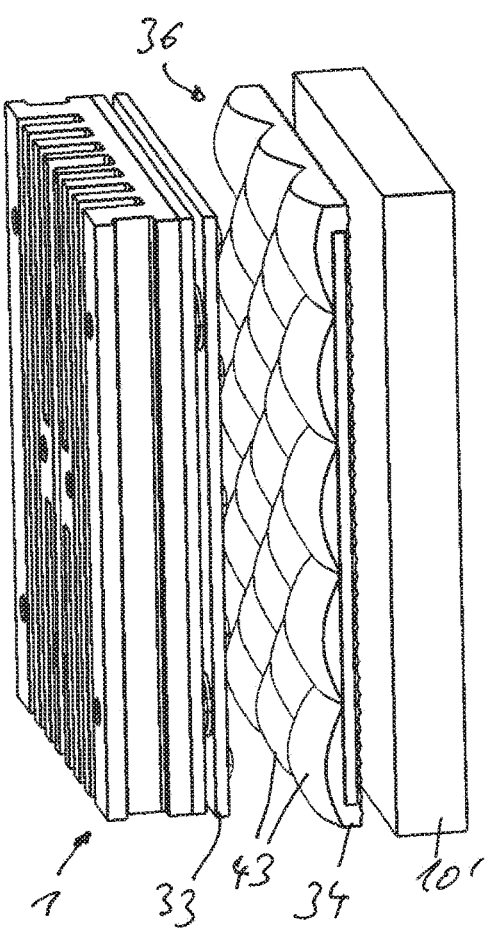
FIG. 15 is a perspective side view of the lighting device from FIG. 13.

According to another embodiment of the invention from FIGS. 13 to 15, the primary optics device has a first optical plate 33 and a second optical plate 34. The first optical plate 33 is arranged on a side of the primary optics device facing the light source unit 1. The second optical plate 34 is arranged on a side of the primary optics device facing the luminous graphic assembly 10'. The first optical plate 33 has, on a front side 35 located at the front in the primary direction of emission H, a multiplicity of aspheric lenses 42 in order to focus the light emitted by the light sources 8. The second optical plate 34 has, on a back 36 that is located at the rear in the primary direction of emission H and that faces the first optical plate 33, a number of lenses 43 in order to capture and parallelize the focused light. On a front side 37 of the second optical plate 34, located at the front in the primary direction of emission H, an optical structure 44, for example pillow optics or strip optics or diffractive diffuser optics, can preferably be provided, preferably as micro-optics with a size from 0.3 mm to 1.5 mm, or as diffractive optics with a dimension between 300 nm and 500 μm, in order to permit a desirable homogeneous illumination of the luminous graphic assembly 10, 10'. The overall installation depth can advantageously be reduced as compared to the embodiment from FIGS. 11 and 12 by this means.

Figure 16:
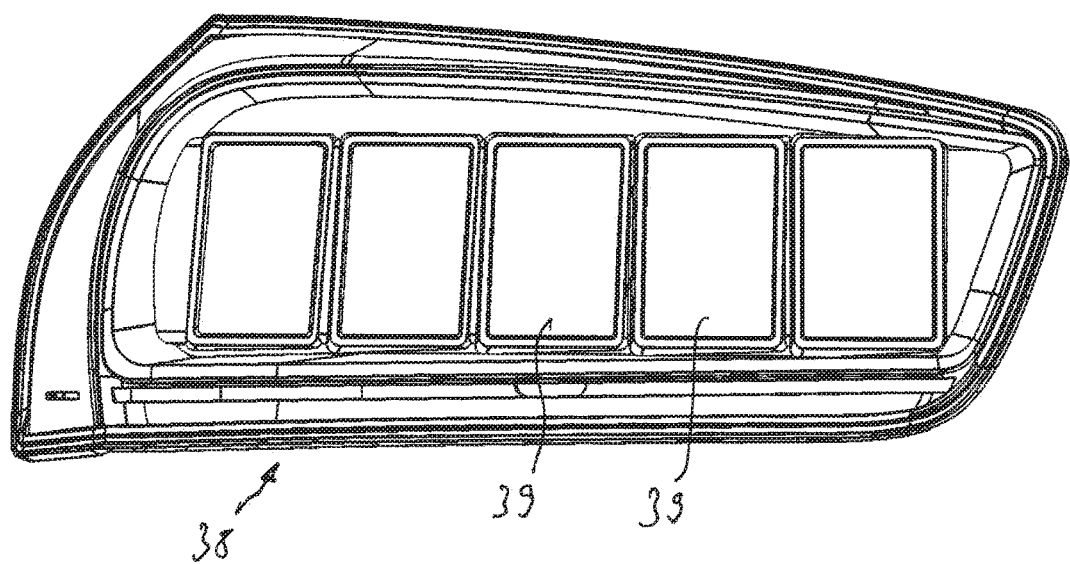
FIG. 16 is a perspective front view of a taillight.
Figure 17:
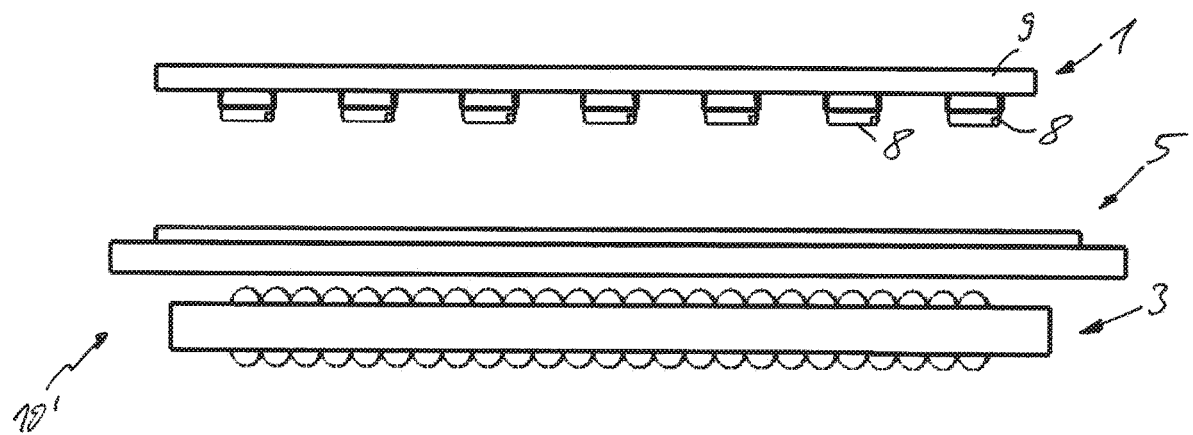
FIG. 17 is a side view of another embodiment of the invention, in which the film material has been exposed with different graphic elements.

The above-described lighting device can be built into a taillight 38 according to FIG. 16, for example, wherein multiple light modules 39, each containing one lighting device, are provided, by means of which the same luminous graphic 11 or different luminous graphics can be generated for signal functions.

As light sources 8, a number of two-color light sources or RGB light sources can also be provided that can be controlled in such a manner that the luminous graphic 11 generated by means of the fixed position of the film material 5 relative to the lens arrangement 3 can be implemented as a multicolor luminous graphic 11 and/or as a luminous graphic 11 with alternating colors.

According to additional embodiments of the invention from FIGS. 17 to 21, the film material 5 is arranged to be movable relative to the lens arrangement 3, namely in the plane of extent F of the film material 5 or in the plane of extent E of the lens arrangement 3. In contrast to the aforementioned exemplary embodiments, the film material 5 does not have the same graphic elements or luminous graphics, but instead has different graphic elements or luminous graphics for generating different luminous graphics or lighting functions depending on a position of the film material 5 relative to the lens arrangement 3. Multiple luminous graphics for generating different lighting functions can advantageously be produced by this means.

In the present exemplary embodiment, the film material 5 has a multiplicity of first film segments 46 that are distributed over the surface of the film material 5 in a matrix-like manner. In addition, the film material 5 has a multiplicity of second film segments 46' that likewise are distributed over the surface of the film material 5 in a matrix-like manner. The multiplicity of first film segments 46 on the one hand and the multiplicity of second film segments 46' on the other hand are arranged to be offset from one another by a displacement distance c in a displacement direction 40.

Figure 18:
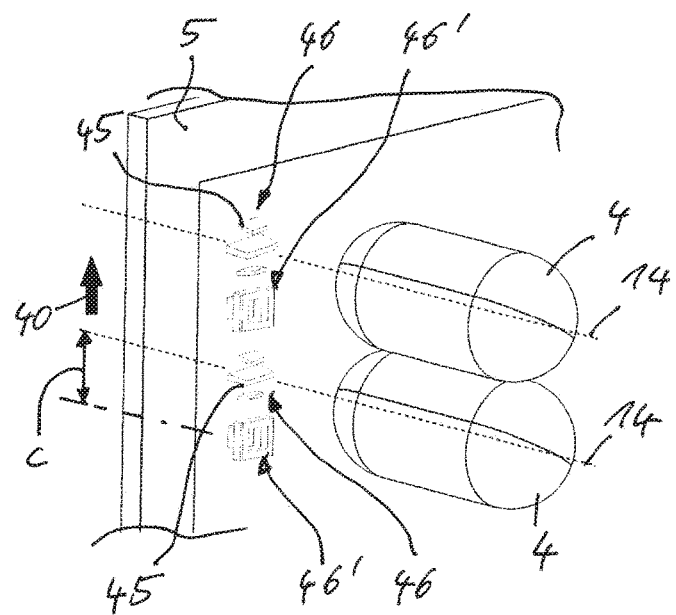
FIG. 18 is an enlarged representation of a subsection of the lighting device from FIG. 17, wherein the film material is located in a first position relative to the lens arrangement, in which first graphic elements are arranged axially to the pairs of lens elements.
Figure 19:
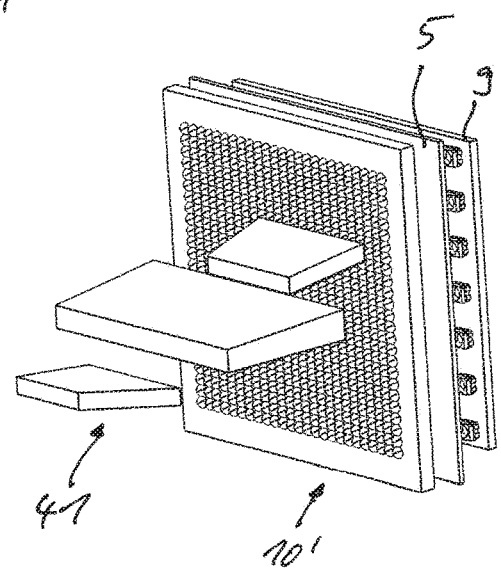
FIG. 19 is a perspective front view of the lighting device in the first relative position of the film surface, with the display of a first generated luminous graphic.

In a first relative position between the film material 5 and the lens arrangement 3 according to FIGS. 18 and 19, the first film segments 46 are in an operating position while the second film segments 46' are in a non-operating position. In the operating position of the first film segments 46, these segments are located in axial extension of the optical axis 14 of the lens elements 4, so that the first graphic elements 45 contained in the first film segments 46 are projected to generate a first luminous graphic 41. In the present exemplary embodiment, the first luminous graphic 41 generated in the first position of the film material 5 relative to the lens arrangement 3 is used to produce a taillight function.

Figure 20:
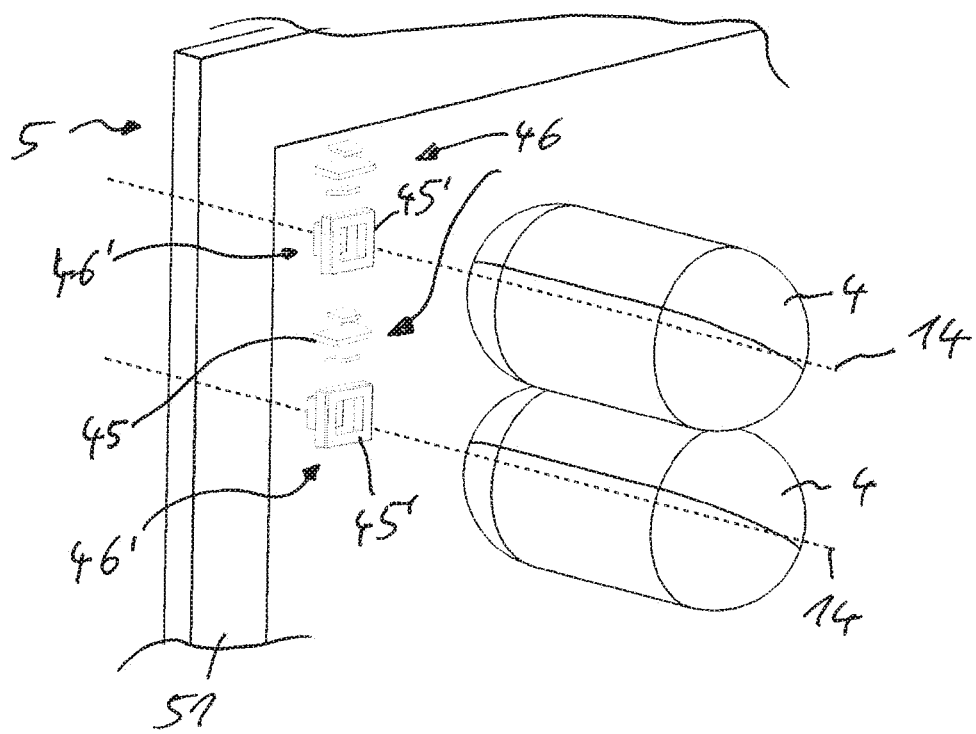
FIG. 20 is an enlarged representation of the subsection of the lighting device from FIG. 17, wherein the film material is located in a second position relative to the lens arrangement, in which second graphic elements are arranged axially to the pairs of lens elements.
Figure 21:
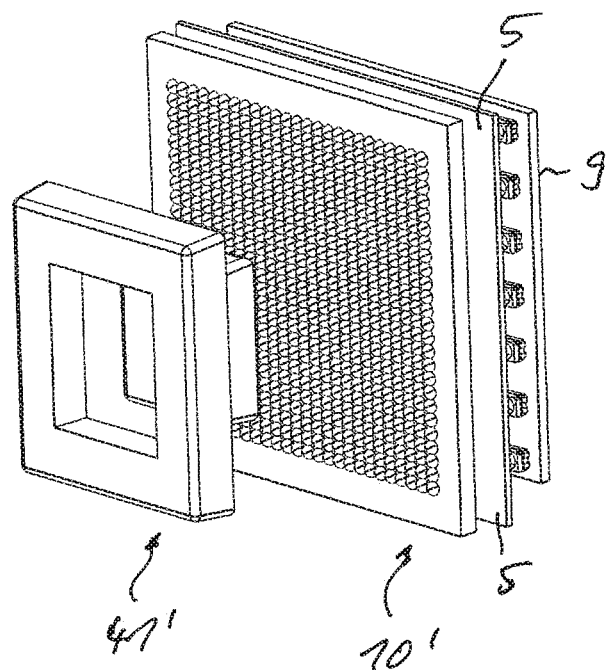
FIG. 21 is a perspective front view of the lighting device from FIG. 20, with a second luminous graphic generated by the same.

In a second position of the film material 5 relative to the lens arrangement 3 according to FIGS. 20 and 21, the film material 5 is in a position that is shifted by the displacement distance c in the displacement direction 40, so that, in a second relative position thus formed, the multiplicity of second film segments 46' are in the operating position, while the multiplicity of first film segments 46 are in a non-operating position. The second film segments 46' each have second graphic elements 45', which, in the second relative position, are located in axial extension to the lens elements 4 or on the optical axis 14 thereof, so that the second graphic elements 45' are projected to generate the second luminous graphic 41', serving to produce a brake light function, for example.

A center-to-center distance of all adjacent first film segments 46 and a center-to-center distance of all adjacent second film segments 46' is twice as long as the displacement distance c. To generate the two different luminous graphics 41, 41', the film material 5 must therefore merely be displaced by the displacement distance c with respect to the lens arrangement 3, with the displacement from the first relative position to the second relative position going in a first direction and from the second relative position to the first relative position going in the opposite direction. Consequently, only the first graphic elements 45 are active in the first relative position, whereas only the second graphic elements 45' are active in the second relative position.

When the displacement direction 40 runs in the vertical direction, the first graphic elements 45 are located in a first, third, fifth row, etc., which is to say in an odd row, while the second graphic elements 45' are located in a second, fourth, sixth row, etc., which is to say in even rows, on the film material 5. It is thus possible to switch relatively quickly between two different lighting functions by changing the relative positions of the film material 5 and the lens arrangement 3.

The degree of backlighting or the degree of luminosity can be adjusted by dimming the light sources 8. For example, the light sources 8 can be controlled in such a manner that they emit higher light intensity in the second position of the film material 5 relative to the lens arrangement 3 than in the first relative position. In this way, a higher intensity function, such as, e.g., brake light and daytime running light, can be produced in the second relative position, while taillight or position light, for example, is produced in the first relative position.

For example, the light sources 8 can be implemented as two-color light sources or as RGB light sources that can be controlled in such a manner that the first graphic elements 45 generated in the first position of the film material 5 relative to the lens arrangement 3 are backlit with light in a first color, and the second graphic elements 45' located in the second position of the film material 5 relative to the lens arrangement 3 are backlit with a second color that is different from the first color. In this way, the first luminous graphic 41 can be produced in a yellow color to generate a turn signal function in the first relative position, while a second luminous graphic 41' in a red color can serve to generate a taillight function in the second relative position. To create a welcome light function, the film material 5 can be provided with any desired manufacturer-dependent graphic element, which is backlit with a manufacturer-dependent color of light so that the welcome light function is supplied with a particular manufacturer-dependent luminous graphic and manufacturer-dependent color.

Figure 22:
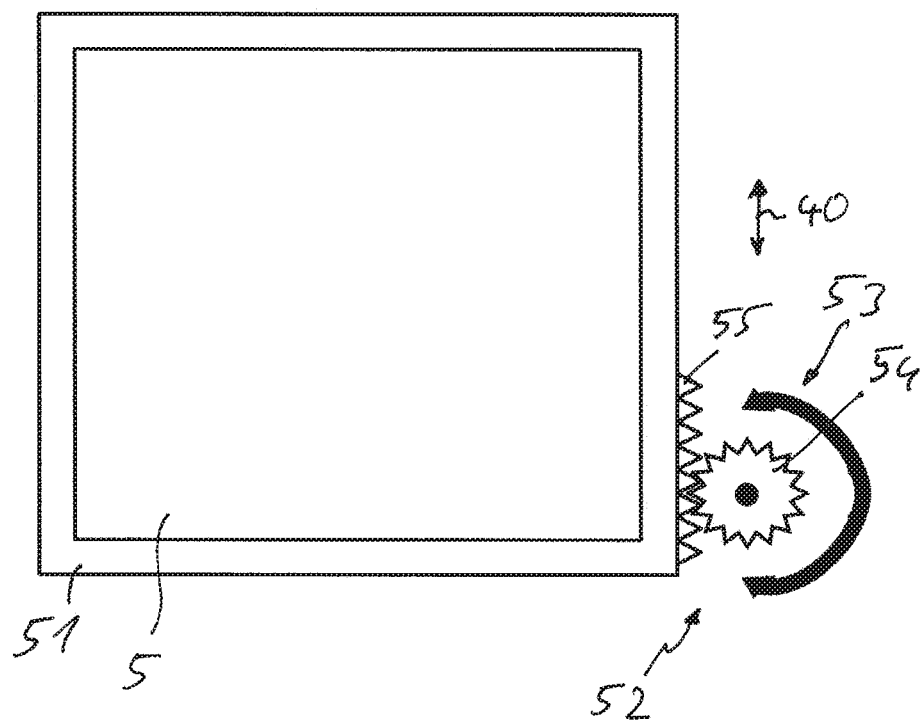
FIG. 22 is a schematic front view of a holder element of the film material, with an adjusting device according to a first embodiment.

For displacement of the film material 5 relative to the stationary lens arrangement 3, the film material 5 is provided with a holder 51, which surrounds the film material 5 in the manner of a frame. The holder 51 is coupled to an adjusting device 52, so that the film material 5 can be moved back and forth by a defined displacement distance c in the displacement direction 40. According to a first embodiment of the adjusting device 52 from FIG. 22, a stepper motor 53 is provided for linear displacement of the film material 5 with respect to the stationary lens arrangement 3, in which a pinion 54 of the stepper motor 53 is coupled with a row of teeth 55, which extends in the displacement direction 40, of the holder 51. Preferably, the holder 51 is arranged so as to be guided in a longitudinal guide of the housing of the lighting device.

Figure 23:
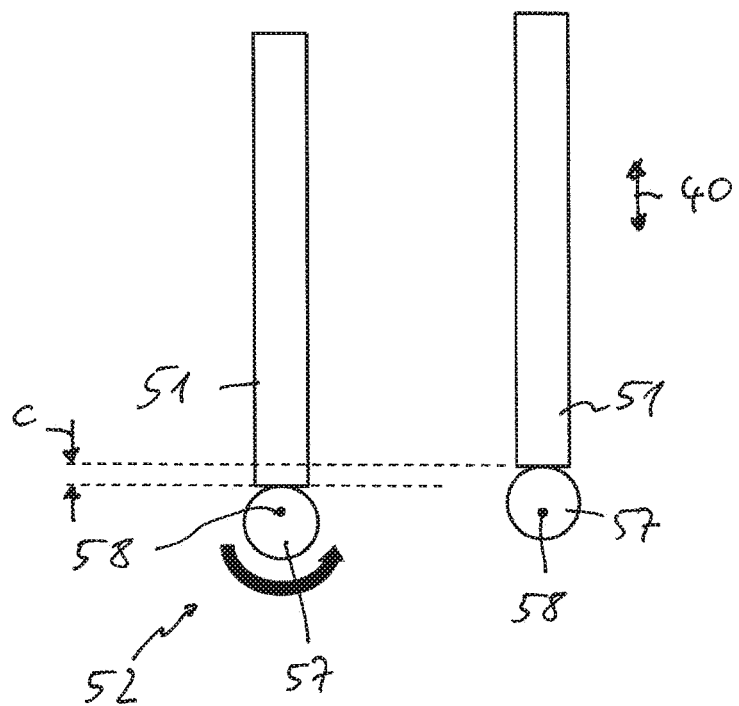
FIG. 23 is a schematic side view of the holder of the film material, with an adjusting device according to a second embodiment.

According to another embodiment of the adjusting device 52 from FIG. 23, an outer edge 56 of the holder 51 is coupled with an eccentric shaft 57, which is rotatable about an eccentric axis 58 that is perpendicular to the displacement direction 40. The eccentric axis 58 extends towards the edge 56 of the holder 51, so that a defined displacement by the displacement distance c takes place upon revolution of the eccentric shaft 57 by 180°.

Alternatively, the adjusting device 52 can also have a linear piezo drive.

According to another embodiment of the invention, the film material 5 can also have more than two different graphic elements. For example, the graphic elements can differ not only by rows, but can also differ by columns. For this purpose, it is necessary that the holder 51 be moved by the corresponding displacement distance c in not just a single direction, but rather in two directions, preferably mutually perpendicular directions. When the film material 5 has a relatively high resolution, five different graphic elements, for example, can be distributed in a regular and matrix-like manner over the film material 5, so that five different luminous graphics can be generated with vertical and horizontal displacement of the film material 5 relative to the lens arrangement 3.

According to an embodiment, the film material 5 can also be arranged to be stationary, while the lens arrangement 3 is displaced linearly.

Figure 24:
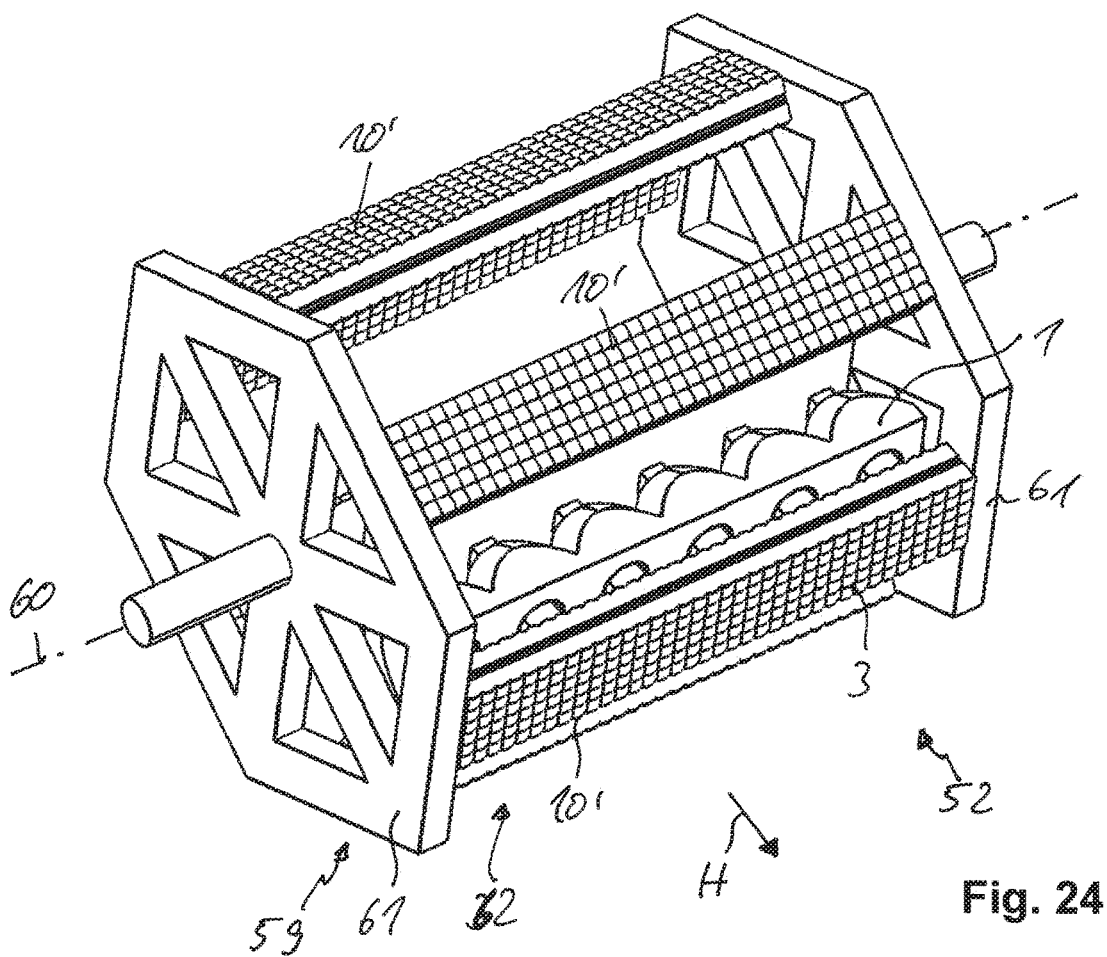
FIG. 24 is a perspective representation of a lighting device and an adjusting device according to a third embodiment.
Figure 25:
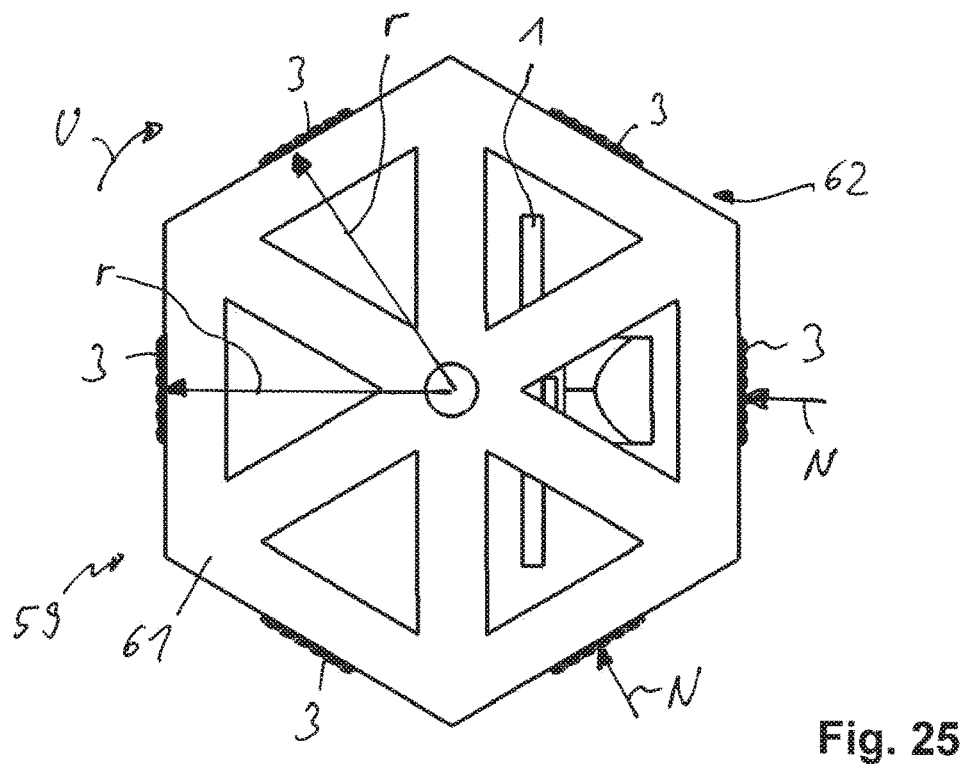
FIG. 25 is a side view of the lighting device from FIG. 24.

According to another embodiment of the invention from FIGS. 24 and 25, the adjusting device 52 can be implemented as a rotary element 59, which preferably is rotatable, in the manner of a rotating drum, about an axis of rotation 60 perpendicular to the primary direction of emission H. The rotary element 59 has two faces 61, between which are arranged multiple luminous graphic assemblies 10', arranged so as to be distributed in the circumferential direction U of the rotary element 59. The luminous graphic assemblies 10 are located in a radially outer edge region 62 of the rotary element 59. Preferably, the luminous graphic assemblies 10' are arranged at a uniform radial distance r of the rotary element 59. The luminous graphic assemblies 10 essentially form a circumferential surface of the rotary element 59, with six luminous graphic assemblies 10' being arranged so as to be distributed in the circumferential direction U in the current exemplary embodiment. The light source unit 1 is arranged so as to be stationary inside the rotary element 59. The luminous graphic assemblies 10' arranged so as to be distributed in the circumferential direction U each have different graphic elements 15 for producing different lighting functions. Consequently, six different lighting functions can be produced as a function of a rotary position of the rotary element 59. In an operating position or illumination position of the rotary element 59, one of the luminous graphic assemblies 10 is located in a plane parallel to a plane of extent of the light source unit 1 and/or to a light-emitting plane of the light source unit 1 so that a desired signal light function can be produced, as illustrated in the aforementioned exemplary embodiments. It is a matter of course that only a single luminous graphic assembly 10' at a time of the multiplicity of luminous graphic assemblies 10' can be brought into the illumination position as a function of the rotary position of the rotary element 59.

The luminous graphic assemblies 10' are arranged in an identical position relative to the axis of rotation 60 such that they assume the same position in the illumination position or operating position as the other luminous graphic assemblies 10' in the illumination position or operating position. A normal N of all luminous graphic assemblies 10' is perpendicular to the axis of rotation 60 of the rotary element 59.

For use as headlights, the graphic elements can have a contour such that projecting them produces a bright/dark boundary for a low beam light distribution or high beam distribution. For example, the luminous graphic assemblies 10 of the rotary element 59 can be designed such that a town passing beam distribution, a low beam distribution, a daytime running light distribution, a basic or country passing beam distribution, a motorway passing beam distribution, or a different light distribution is produced as a function of the rotary position.

It is a matter of course that the aforementioned features of the exemplary embodiments may also be combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a vehicle, the lighting device comprising:
    a light source unit;
    an optical unit having a lens arrangement with at least two lens elements, the at least two lens elements being arranged so as to be distributed in a matrix-like manner;
    a flat film material with at least two film segments that each contain a graphic element is arranged upstream of the lens arrangement in a light path and downstream of the light source unit in the light path,
    wherein the graphic elements are recorded by exposure of the film material equipped with the lens arrangement such that different lens elements of the lens arrangement are associated with each of the film segments such that a luminous graphic containing the graphic element is created to form the light distribution and the lighting function through illumination of the film material via the light source unit,
    wherein the light source unit is controlled such that a first region of the film material is more strongly illuminated than a second region of the same, or wherein multiple adjacent regions of the film material are illuminated in succession so that the whole luminous graphic is switched on or off through activation and/or deactivation of multiple sequential illumination sections of the same.

2. A lighting device for a vehicle, the lighting device comprising:
    a light source unit;
    an optical unit having a lens arrangement with at least two lens elements, the at least two lens elements being arranged so as to be distributed in a matrix-like manner;
    a flat film material with at least two film segments that each contain a graphic element is arranged upstream of the lens arrangement in a light path and downstream of the light source unit in the light path,
    wherein the graphic elements are recorded by exposure of the film material equipped with the lens arrangement such that different lens elements of the lens arrangement are associated with each of the film segments such that a luminous graphic containing the graphic element is created to form the light distribution and the lighting function through illumination of the film material via the light source unit,
    wherein the film material is at a distance of 1 mm to 4 mm from the light source unit and directly at a boundary surface extending along the back of the lens arrangement.

3. A lighting device for a vehicle, the lighting device comprising:
    a light source unit;
    an optical unit having a lens arrangement with at least two lens elements, the at least two lens elements being arranged so as to be distributed in a matrix-like manner;
    a flat film material with at least two film segments that each contain a graphic element is arranged upstream of the lens arrangement in a light path and downstream of the light source unit in the light path,
    wherein the graphic elements are recorded by exposure of the film material equipped with the lens arrangement such that different lens elements of the lens arrangement are associated with each of the film segments such that a luminous graphic containing the graphic element is created to form the light distribution and the lighting function through illumination of the film material via the light source unit,
    wherein adjacent lens elements and/or adjacent film segments have a center-to-center distance in a range from 0.5 mm to 2 mm.

4. The lighting device according to claim 3, wherein, in an operating position, the lens arrangement is located in a fixed position relative to the film material, wherein the film segment of the film material is positioned in axial extension of a single lens element, and wherein the film segments associated with the lens elements has its own graphic element.

5. The lighting device according to claim 3, wherein the lens arrangement has a carrier with a carrier surface along which the lens elements are arranged at equal distances in rows and columns, and wherein the carrier surface is parallel to the surface of the film material.

6. The lighting device according to claim 3, wherein the optical unit has a primary optics device located downstream of the light source unit in the light path and upstream of the lens arrangement in the light path, wherein the optics device:
- has a flat light guide with a face side as an output surface and a narrow side as an input surface, or
- has a reflector arrangement with at least two reflector elements, each associated with the light sources, or
- has a light guide containing at least two light guide elements, each associated with the light sources, wherein the light guide elements have a totally reflecting lateral surface and input and output surfaces arranged on opposite faces.

7. The lighting device according to claim 3, wherein the primary optics device has a first optical plate facing the light source unit with lenses for focusing the light emitted by the light sources, and a second optical plate facing away from the light source unit with lenses arranged on a side facing the first optical plate for parallelizing the light and with an optical structure on the side facing away from the first optical plate implemented as pillow optics or strip optics, or as micro-optics with a size from 0.3 mm to 1.5 mm, or as diffractive optics with a dimension between 300 nm and 500 µm, for homogeneous illumination of the film material.

8. The lighting device according to claim 3, wherein the lens arrangement has lens elements on both sides of its plane of extent, and wherein the lens elements of the applicable pairs of lens elements have the same optical axis.

9. The lighting device according to claim 3, wherein the lens arrangement is attached to the film material in a fixed manner in order to form a luminous graphic assembly.

10. The lighting device according to claim 3, wherein a separate light source is associated with each lens element of the lens arrangement or with each pair of lens elements.

11. The lighting device according to claim 3, wherein the film material is arranged so as to be movable in its direction of extent relative to the lens arrangement, so that, in a first position of the film material relative to the lens arrangement, a number of first film segments of the film material are located on the optical axis of the lens elements in an operating position for generating a first luminous graphic and a number of second film segments of the film material are located in a non-operating position, and wherein, in a second position of the film material relative to the lens arrangement, the number of second film segments of the film material are located on the optical axis of the lens elements in the operating position for generating a second luminous graphic and the number of the first film segments of the film material are located in the non-operating position.

12. The lighting device according to claim 11, wherein the light sources are controlled in such a manner that, in the second position of the film material relative to the lens arrangement, the second film segments are backlit with light with a higher light intensity than the first film segments in the first relative position in order to generate a lighting function with greater light intensity as compared to the first relative position.

13. The lighting device according to claim 3, wherein the light sources are provided as a number of two-color light sources or as RGB light sources that are controllable such that the first luminous graphic generated by the first position of the film material relative to the lens arrangement appears in a first color, and the second luminous graphic generated by the second position of the film material relative to the lens arrangement appears in a second color of light, or in such a manner that the luminous graphic generated by the fixed position of the film material elative to the lens arrangement is implemented as a multicolor luminous graphic and/or as a luminous graphic with alternating colors.

14. The lighting device according to claim 3, wherein the film material is provided with a holder that is coupled to an adjusting device, wherein the adjusting device comprises:
- a stepper motor for moving the film material into the first relative position and the second relative position, or
- an eccentric shaft, or
- a linear piezo drive, or
- another suitable adjusting mechanism.

15. The lighting device according to claim 3, wherein the film material is arranged to be linearly displaceable in the horizontal and/or vertical direction relative to the lens arrangement.

16. The lighting device according to claim 3, wherein the adjusting device includes a rotary element that is arranged about an axis of rotation substantially perpendicular to the primary direction of emission, on which element are arranged so as to be distributed in the circumferential direction multiple luminous graphic assemblies having the film material and the lens arrangement attached in a fixed manner to the same, so that a single luminous graphic assembly at a time of the multiplicity of luminous graphic assemblies is, as a function of the rotary position of the rotary element, brought into an operating position in which it is located in front of the light source unit in a primary direction of emission.

17. The lighting device according to claim 3, wherein a normal of all the luminous graphic assemblies is arranged to be substantially perpendicular to the axis of rotation.

\* \* \* \* \*